Patented Aug. 24, 1926.

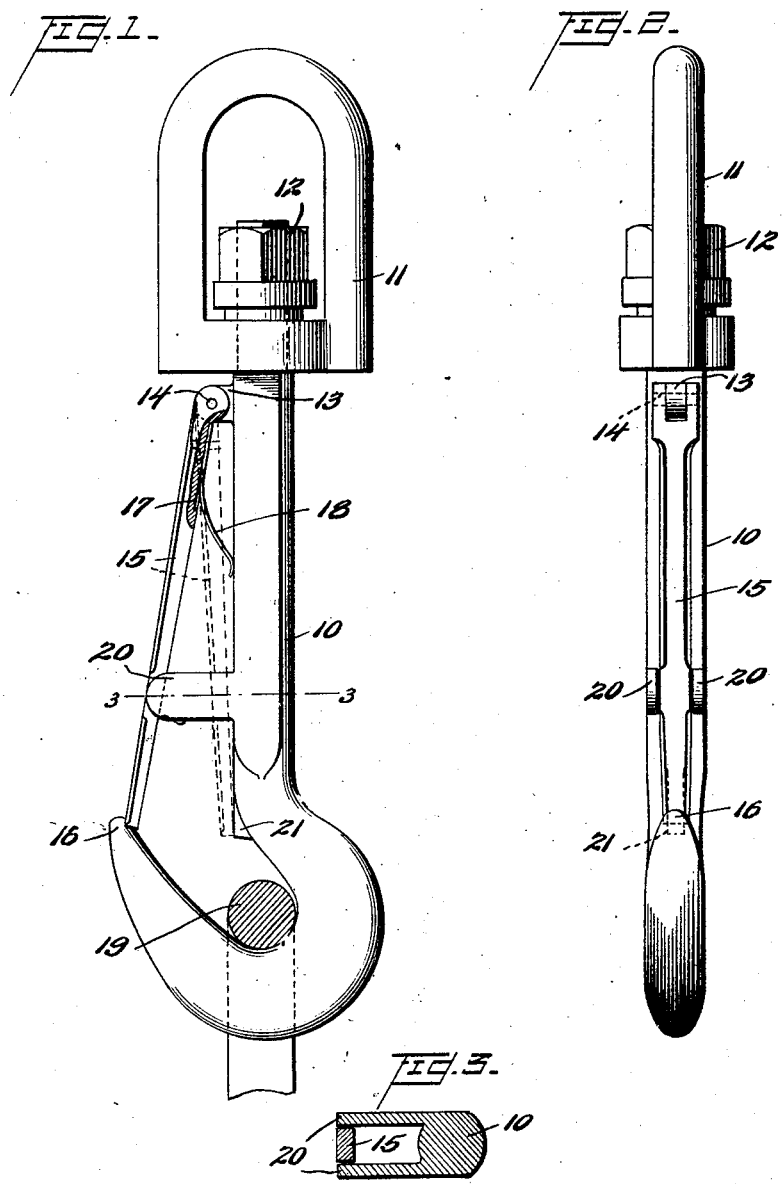

1,596,948

UNITED STATES PATENT OFFICE.

WILLIAM W. SAUNDERS, OF BURKBURNETT, TEXAS.

SAFETY HOOK.

Application filed January 5, 1926. Serial No. 79,478.

This invention relates to hooks, and more particularly to a hook to be employed to remove tubing, rods or casings from oil wells.

It is an object of this invention to provide a locking member on the hook to effectively prevent displacement of the eye or elevator bail engaged by the hook, the hook being provided with means to prevent lateral movement of the locking member. This construction insures proper positioning of the lock with respect to the hook at all times.

It is a further object of this invention to provide a guard or projection immediately above the bight of the hook to prevent bending or breaking of the locking member.

With these objects in view, the combination and arrangement of parts will be understood from the following description of the preferred form of the invention taken in connection with the drawings in which:

Figure 1 is a side elevation of a hook provided with the novel features of the invention;

Figure 2 is a front elevation of the hook and other parts shown in Figure 1; and Figure 3 is a sectional view taken on the line 3—3 of Figure 1.

Referring to the drawings, the hook 10 is of the usual type employed in pulling tubing, sucker rods and like members in the drilling and operation of oil wells. The hook is provided with a swivel head 11 secured by a nut 12. Integral with the hook 10, near its upper end, is an ear 13 to which is hinged, by means of pin 14, a locking tongue 15, the length of which is such that it engages the nose 16 of the hook when in its locking position, as shown in full lines in Fig. 1. The underside of the tongue 15 is grooved near its hinged end, the groove 17 being approximately the width of a spring 18 which has a straight portion at one end and is then bowed so that the straight portion lies in the groove and the other end bears against the hook 10. Normally, the tongue is forced by the spring 18 toward the nose of the hook, the tongue in this position closing the hook to prevent displacement of the bail or other part 19 engaged by the hook.

On the sides of the hook, spaced apart approximately the width of the tongue 15 and inegral with the hook, are two ears 20, the purpose of which is to prevent lateral movement of the tongue 15. These ears are long enough to guide the tongue to its furthest outward position and are spaced sufficiently far enough from the nose of the hook that bails large enough to fit within the bight of the hook may be drawn into the hook.

Immediately above the bight or curved portion of the hook, a projection or guard 21 is provided, the purpose of which is to prevent the end of the tongue from being bent or broken when the hook is engaging a bail. As shown in Fig. 1, the tongue 15 extends below the straight shank portion of the hook 10 when forced inwardly. As the bail enters the bight of the hook the end of the tongue may be struck with sufficient force that, in the absence of some supporting means, it will be bent or broken. This danger is eliminated by providing the guard 21 which acts as a rest or bearing for the end of the tongue, the guard being formed on the shank of the hook at a point equal in distance from the ear 13 to the length of the tongue. The guard 21 performs the further function of obstructing the opening in the hook to a certain degree, thus preventing, to some extent, the bail from riding upwardly.

When engaging a bail or other object, the hook is pressed against said object, forcing the spring pressed tongue against the shank of the hook. After the object has been drawn into the bight of the hook, the tongue is forced by the spring into its closed position, thereby preventing displacement of the object. Lateral movement of the tongue is prevented by the ears 20, further securing the tongue in its locked position. In this manner the bail or other object is firmly engaged by the hook and securely locked therein.

Having thus described the invention, what is claimed as new and desired to be secured by Letters Patent is:

1. The combination with a hook having an elongated straight shank and a curved bight portion, of an elongated straight locking tongue for closing the bight of said hook, said tongue being pivoted at one end to said shank and adapted to lie close to said shank when the tongue is in its unlocked position, the free end of said tongue extending beyond the shank portion of said hook and a projection on said shank adapted to support the free end of said tongue.

2. The combination with a hook having an elongated straight shank and a curved bight portion, of an elongated straight locking tongue for closing the bight of said hook, said tongue being pivoted at one end to said shank and adapted to lie close to said shank when the tongue is in its unlocked position, a pair of ears projecting from said shank on each side of said tongue and intermediate its ends, to prevent lateral movement of the tongue, said ears also serving to prevent the bail engaged by the bight from riding up and jamming between the shank and tongue.

In testimony whereof I hereunto affix my signature.

WILLIAM W. SAUNDERS.